Dec. 27, 1966   C. D. SHALLENBERGER, JR., ET AL   3,294,797
CHLOROCYANURATE PROCESS
Filed Dec. 30, 1963
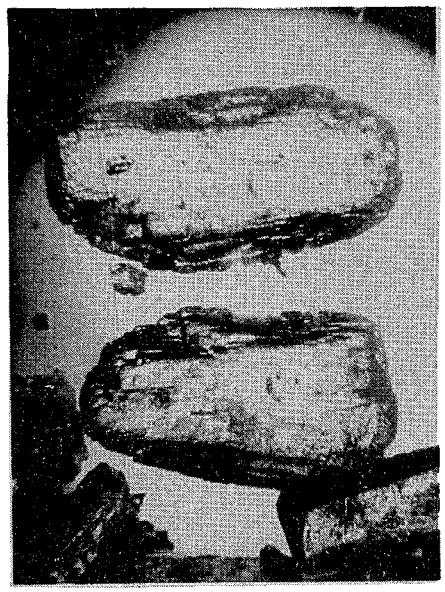   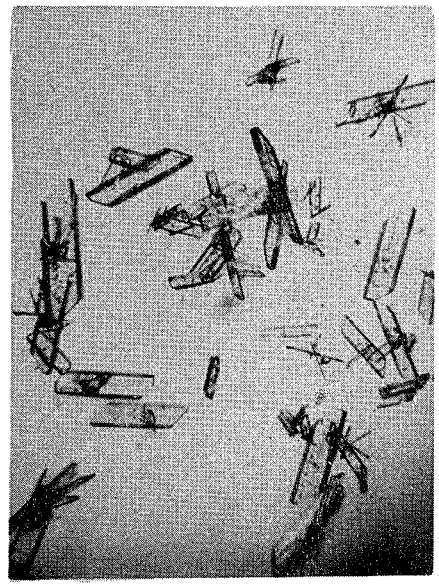
FIG. 1 (150X)      FIG. 2 (150X)
Inventors
C. Douglas Shallenberger JR
William F. Symes
By Harold M. Baum
Attorney United States Patent Office 3,294,797
Patented Dec. 27, 1966

3,294,797
CHLOROCYANURATE PROCESS
Clarence Douglas Shallenberger, Jr., Kirkwood, and William F. Symes, Webster Groves, Mo., assignors to Monsanto Company, a corporation of Delaware
Filed Dec. 30, 1963, Ser. No. 334,504
15 Claims. (Cl. 260—248)

The present invention relates to novel processes for preparing alkali metal dichlorocyanurates and to novel crystalline alkali metal dichlorocyanurates characterized in being composed of relatively large crystals. The present invention more particularly relates to novel batch and continuous processes for preparing alkali metal dichlorocyanurates consisting of large crystals.

Alkali metal dichlorocyanurates, sometimes termed alkali metal dichloroisocyanurates may be represented structurally as:

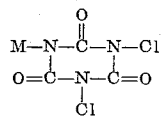

where M is an alkali metal such as sodium, potassium, lithium, cesium, rubidium and the like. Although such dichlorocyanurates which are encompassed in this formula are represented structurally as being in the keto or iso form it is to be understood that these compounds may also exist in the enol form or as mixtures of the enol and keto (or iso) forms.

The term dichlorocyanurate as used herein and in the appended claims is intended to include the enol form or the keto form and/or mixtures of these forms.

It has been proposed heretofore in U.S. Patent 3,035,056 to prepare sodium dichlorocyanurate or potassium dichlorocyanurate by chlorinating trisodium or tripotassium cyanurate with chlorine in an aqueous medium in a reaction zone at a pH in the range of from 6.0 to 8.5 and at a temperature in the range of from about 0° C. to about 60° C. In such processes sodium or potassium dichlorocyanurate (depending upon the metal cyanurate originally employed) is formed. The above described dichlorocyanurates are formed as solids in the aqueous medium which contains a solution of the corresponding (e.g. sodium or potassium) chloride. According to this patent the solids are separated by centrifugation or filtration, thereafter washed to remove the metal chloride and then are dried to provide white crystalline solids which consist substantially of small crystals having a size such that they will pass through a No. 100 mesh U.S. standard screen. Crystals so prepared usually contain 0.2% by weight and more of the corresponding metal chloride.

Although the sodium or potassium dichlorocyanurates obtained by the above processes are highly efficient as bleaching, washing, sterilizing and/or disinfecting agents they possess certain disadvantages due to the small size of the crystals. Thus such sodium or potassium dichlorocyanurates when employed in the manufacture of commercial washing, bleaching, sterilizing and/or disinfecting formulations often cause problems of dust formation during manufacture of the formulations. Also dichlorocyanurates having small crystalline sizes tend to lose small but substantially significant amounts of available chlorine when handled and/or stored under the usual conditions of commerce.

It has also been proposed heretofore in U.S. Patent 3,035,054, issued May 15, 1963, to William F. Symes and Nicholas S. Hadzekyriakides to prepare potassium dichlorocyanurate by a process in which dichlorocyanuric acid and potassium hydroxide are reacted at a pH in the range of from 6.5 to 7.5. According to this patent it is possible to increase the particle or crystalline size of certain species of potassium dichlorocyanurate by crystallizing this compound from super-saturated solutions thereof. Using such procedure it was possible to increase the size of the crystals of potassium dichlorocyanurate to the point where all or substantially all of such crystals would be retained on a No. 100 mesh U.S. standard screen whereas if the crystallization procedures were omitted a large proportion of crystals passed through the No. 100 mesh U.S. standard screen. The crystals of potassium dichlorocyanurate produced by the techniques of this patent are free or substantially free of alkali metal chlorides. While the aforementioned method of obtaining large crystals of potassium dichlorocyanurate at least partially overcomes the problem of dusting when potassium dichlorocyanurate is used, such crystallization process has the disadvantage of being uneconomical and time consuming.

It has also been proposed heretofore in U.S. Patent 2,964,525, issued December 13, 1960, to William S. Robinson to prepare dichlorocyanuric acid by continuously introducing an aqueous solution or dispersion of dipotassium cyanurate in a reaction zone at a temperature within the range of just above the freezing point of the solution or dispersion up to 50° C. and to continuously introduce chlorine into the solution in the reaction zone in an amount at least equal to the stoichiometric amount of chlorine necessary to replace potassium ions of the potassium cyanurate with chlorine atoms. In this process chlorine is continuously dispersed through the solution or dispersion to maintain it at a pH of not more than 4.5 to form an aqueous reaction mixture having the same pH and comprising a slurry of dichlorocyanuric acid in which two mols of potassium chloride are present (in solution in the aqueous phase of the slurry) for each mol of solid dichlorocyanuric acid dispersed in the slurry. Thus, the aqueous reaction mixture contains about 43% by weight, based on the weight of the dichlorocyanuric acid, of potassium chloride. Solid dichlorocyanuric acid is conventionally recovered from the reaction mixture and generally contains from 0.3 to 3.0% by weight of potassium chloride which is recovered along with the dichlorocyanuric acid.

When commercial dichlorocyanuric acid prepared in accordance with the teaching of the Robinson patent is employed to prepare potassium dichlorocyanurate in accordance with the teachings of the aforementioned U.S. Patent 3,035,054 the potassium dichlorocyanurate initially formed is composed of small crystals most of which pass through a No. 100 mesh U.S. standard screen. Such small crystals also contain from about 0.15 to 0.25% by weight of residual potassium chloride which may be removed (if recrystallization processes are resorted to) to obtain large crystals.

The present invention, in part, provides novel processes by which it is possible to obtain large crystals of alkali metal dichlorocyanurates which are generally larger than previously obtainable crystals of these compounds. Such crystals, when prepared in accordance with the processes of this invention can be obtained economically, directly and without the necessity of the time consuming crystallization procedures described in the aforementioned U.S. Patent 3,035,054. Crystals of potassium dichlorocyanurate obtained by the processes of the present inventioin differ from the large crystals obtained by the crystallization techniques of the aforementioned U.S. Patent 3,035,054 in that the present crystals contain minute amounts, e.g. 0.1% or less by weight, of sodium chloride and are significantly larger than these prior art crystals. Also, the alkali metal cyanurate crystals obtained by the processes of the present invention provide an economical means of overcoming the problems of dusting inherent in dichlorocyanurate products having small crystal sizes. Additionally, the crystalline alkali metal dichlorocyanurate products obtained by the processes of the present invention are somewhat more stable toward loss of available chlorine than corresponding alkali metal dichlorocyanurates which are composed of smaller sized crystals.

It is one object of this invention to provide novel processes for preparing alkali metal dichlorocyanurates.

It is another object of this invention to provide novel processes for preparing crystalline alkali metal dichlorocyanurates characterized in having large crystals and excellent stability toward loss of available chlorine.

It is a further object of this invention to provide novel crystals of alkali metal dichlorocyanurates.

Still further objects and advantages of the present invention will become apparent to those skilled in the art from the following description and the appended claims.

FIGURE 1 is a photomicrograph of large crystals of potassium dichlorocyanurate characterized in having triclinic internal and external symmetries and containing minute amounts of sodium chloride which was prepared in accordance with a preferred embodiment of the processes of the present invention. The photograph was taken through a microscope in which the field (and therefore the crystals) was magnified 150 times.

FIGURE 2 is a photomicrograph of crystals of potassium dichlorocyanurate characterized in having triclinic internal and external symmetries which were prepared by a prior art process and contained small amounts (e.g. 0.06% by weight) of potassium chloride.

The improved alkali metal dichlorocyanurates are obtained by a novel process which comprises reacting a dichlorocyanuric acid product containing sodium chloride but not more than 0.1% by weight of sodium chloride and an alkali metal hydroxide in an aqueous medium at a pH in the range of from about 5.5 to about 8.0 and at a temperature in the range of from about 0° C. to about 65° C. until a crystalline alkali metal dichlorocyanurate is formed. By so proceeding large masses (e.g. crystals) of alkali metal dichlorocyanurates are formed directly in the aqueous medium. Crystals which contain minute amounts, e.g. from about 0.01 to about 0.1% by weight, of sodium chloride within the crystalline structure are usually obtained. These crystalline alkali metal dichlorocyanurates when dried, are composed of relatively large crystals and have a particle or crystalline size such that more than 75% by weight of the crystals are retained on a No. 60 mesh U.S. standard screen. These large crystals are obtained directly and without the necessity of prolonged, time consuming crystallization procedures and are generally larger than crystalline alkali metal dichlorocyanurates which have been subjected to such crystallization procedures. Also crystalline, alkali metal dichlorocyanurates obtained by recrystallization procedures are generally substantially free of alkali metal chlorides, including sodium chloride, and are somewhat smaller than the crystals obtained by the processes of the present invention and less than 10% by weight of these prior art crystals are usually retained on a No. 60 mesh U.S. standard screen.

The dichlorocyanuric acid employed in the processes of this invention may be prepared by a variety of conventional methods such as for example the chlorination of di-alkali metal cyanurates using conditions similar to those described in the aforementioned Robinson patent. However, commercial dichlorocyanuric acid products usually contain substantial quantities (e.g. sometimes up to 5% by weight) of alkali metal chlorides and it is important that the dichlorocyanuric acid employed in the processes of the present invention be substantially free of alkali metal chlorides with the exception of sodium chloride. Sodium chloride is present in the dichlorocyanuric acid products employed in the processes of this invention in amounts of 0.1% or less by weight. Surprisingly, when the dichlorocyanuric acid contains amounts of sodium chloride within the range of from about 0.01% to about 0.1% by weight it is possible to obtain larger crystals of alkali metal dichlorocyanurates than are obtainable when the dichlorocyanuric acid is free or substantially free of alkali metal chlorides and/or contains trace amounts of alkali metal chlorides such as potassium, lithium, cesium, rubidium chlorides. On the other hand, if the dichlorocyanuric acid contains trace amounts of alkali metal chlorides other than sodium chloride small crystals having the crystalline shape and size of the prior art products will be obtained. However, when dichlorocyanuric acid which is free or substantially free of alkali metal chlorides is used in the process of this invention, although larger crystals will be obtained, such crystals will not be as large as the crystals obtained when dichlorocyanuric acid containing from about 0.01 to 0.1% by weight of sodium chloride is employed. However, when the dichlorocyanuric acid contains above about 0.1% by weight of NaCl smaller crystals of alkali metal dichlorocyanurates corresponding to the compounds obtained in the prior processes will be obtained.

As noted hereinbefore commercially available dichlorocyanuric acids may contain up to 5.0% by weight, based on the weight of the dichlorocyanuric acid, of sodium or potassium chloride, the particular chloride present being dependent upon whether the product was made by chlorinating dipotassium or disodium cyanurate. The dichlorocyanuric acid employed in the processes of this invention may be a pure dichlorocyanuric acid to which the aforementioned quantities, e.g. from 0.01 to 0.1% by weight, of sodium chloride has been added or may be a dichlorocyanuric acid which originally contained substantial quantities, e.g. from about 0.3 to about 5.0% by weight, of sodium chloride and from which all but 0.1% or less of the sodium chloride has been removed. Although the function of sodium chloride in obtaining the large crystals of alkali metal dichlorocyanurates in accordance with the processes of this invention is not understood, it was surprising that the presence of such sodium chloride in dichlorocyanuric acid results in the formation of large crystals of alkali metal dichlorocyanurates when the dichlorocyanuric acid is reacted with alkali metal hydroxides including alkali metal hydroxides other than sodium hydroxide.

The dichlorocyanuric acid which is most advantageously employed in the processes of this invention may be obtained by removing a major proportion of the sodium chloride present in commercially available dichlorocyanuric acid products which have been prepared by chlorinating disodium cyanurate with chlorine. As noted hereinbefore, commercially available dichlorocyanuric acid products, which have been prepared by chlorinating disodium cyanurate with chlorine, usually contain from about 0.3 to about 3.0% by weight of sodium chloride. The sodium chloride can be readily separated from the dichlorocyanuric acid product by washing the product with water at a temperature in the range of from about 5° C. to 60° C. until the product contains 0.1% or less by weight of sodium chloride. The washing is advantageously carried out by slurrying the dichlorocyanuric acid in water in which the sodium chloride will dissolve and filtering the liquid from the dichlorocyanuric acid solids.

Usually if such procedure is repeated several times the desired dichlorocyanuric acid product, containing from about 0.01 to 0.1% by weight of NaCl, is obtained. The removal of the sodium chloride from the dichlorocyanuric acid to a point where the dichlorocyanuric acid contains less than 0.01% by weight of sodium chloride is not desirable and is usually difficult unless the dichlorocyanuric acid is repeatedly washed with water. The dichlorocyanuric acid employed in the processes of this invention is usually in the form of an aqueous slurry containing from about 50 to 85% dichlorocyanuric acid and from about 50 to 15% by weight of water.

The alkali metal hydroxides which may be employed in the processes of this invention include lithium, sodium, potassium, cesium and rubidium hydroxides. The particular alkali metal hydroxides employed will correspond to the particular alkali metal dichlorocyanurate which it is desired to prepare. Generally, the alkali metal hydroxide can be added to the aqueous medium per se but it is preferable that such hydroxide be added in the form of a solution containing from between about 5 to about 50% by weight of alkali metal hydroxides.

The dichlorocyanuric acid and alkali metal hydroxide are reacted in an aqueous medium at a pH in the range of from about 5.5 to about 8.0 and these conditions can be suitably accomplished by regulating the rate of addition of dichlorocyanuric acid and alkali metal hydroxide either dry or in the form of a dispersion or solution to the aqueous medium. Generally, the reactants in the aqueous medium should be controlled so that the total solids content in the reaction mixture of the aqueous medium does not exceed 50% by weight of the total mixture. Stated differently, in the reaction zone in which the aqueous medium is contained, the water content should not be less than 50% of the total mass therein otherwise the contents of the reaction mixture present a problem in the agitating and handling thereof.

The reaction temperature employed in the processes of this invention may vary in the range of from about just above the freezing point to about 65° C. Although temperatures above 65° C. may sometimes be employed there is a danger that the triazine ring of the chlorocyanurate molecule will decompose at these temperatures resulting in the formation of nitrogen trichloride which is a toxic material and is also dangerous in that it has explosive properties. Also the employment of temperatures above 65° C. will sometimes result in lower yields of alkali metal dichlorocyanurate. Preferably reaction temperatures in the range of about 15° C. to about 50° C. are employed in the processes of this invention and it is particularly preferred to use a temperature in the range of from about 20° C. to about 40° C.

In one advantageous embodiment of this invention improved alkali metal dichlorocyanurates are prepared by a process which comprises the steps of (1) preparing dichlorocyanuric acid by reacting disodium cyanurate and chlorine in an aqueous medium to form a reaction mixture comprising an aqueous slurry consisting substantially of solid dichlorocyanuric acid suspended in an aqueous solution of sodium chloride, (2) recovering a solid product consisting of a mixture comprising dichlorocyanuric acid and a minor amount (e.g. from about 0.3 to about 3.0% by weight based on the weight of the dichlorocyanuric acid) of sodium chloride from the bulk of the aqueous phase of the slurry, (3) separating the sodium chloride from the product until a dichlorocyanuric acid product containing sodium chloride but not more than 0.1% by weight of sodium chloride is formed, and (4) reacting the dichlorocyanuric acid product with an aqueous solution of an alkali metal hydroxide under the pH and temperature conditions hereinbefore described until a crystalline alkali metal dichlorocyanurate is formed.

In such process the dichlorocyanuric acid is prepared by reacting disodium cyanurate and chlorine, most advantageously in an aqueous medium, at a pH of from 2.0 to 4.5 and at a temperature in the range of from about 0° C. to 35° C. and the sodium chloride in the product can be readily removed by washing the dichlorocyanuric acid (while in the form of a water wet solid) with water until the cyanuric acid contains the desired amount of sodium chloride. The dichlorocyanuric acid is then reacted with an alkali metal hydroxide preferably an aqueous solution of an alkali metal hydroxide under the conditions hereinbefore described.

The processes of this invention are particularly applicable to the preparation of crystalline alkali metal dichlorocyanurates such as sodium and potassium dichlorocyanurates which are commonly sold in commerce as bleaching agents and are especially applicable to those crystalline alkali metal cyanurates whose crystalline hydrates upon dehydration form pseudomorphic crystals, that is, the crystals retain their original sizes and external form when water is removed therefrom by usual drying methods such as, for example, by heat or vacuum drying. A notable example of an alkali metal dichlorocyanurate which forms pseudomorphic crystals is crystalline potassium dichlorocyanurate monohydrate and the pseudomorph thereof described in the hereinbefore mentioned U.S. Patent 3,035,054.

The crystalline monohydrate of potassium dichlorocyanurate is a crystalline solid whose internal and external symmetry is triclinic and the anhydrous pseudomorph of the crystalline monohydrate is a white crystal whose internal symmetry is monoclinic but whose external symmetry is triclinic. In other words the pseudomorphic crystal although it loses its water of hydration retains the original size and shape of the monohydrate.

In accordance with one advantageous embodiment of the processes of this invention a freshly prepared water wet dichlorocyanuric acid product comprising a mixture of dichlorocyanuric acid, from about 0.3 to about 3% by weight based on the weight of the dichlorocyanurate of sodium chloride and about 5 to 25% by weight of water is washed with water to separate or remove all but about 0.1% or less by weight of the sodium chloride and the product is reacted with an alkali metal hydroxide such as for example sodium or potassium hydroxide as hereinbefore described.

In accordance with a preferred embodiment of the processes of this invention, dichlorocyanuric acid in the form of an aqueous slurry and an alkali metal hydroxide in the form of an aqueous solution containing from about 30% to about 50% by weight of hydroxide are reacted in an aqueous medium under the conditions hereinbefore described.

In accordance with another preferred embodiment of the processes of this invention crystalline potassium dichlorocyanurate is prepared by reacting an aqueous slurry of dichlorocyanuric acid prepared as hereinbefore described and containing from between 0.01 to about 0.1% by weight of sodium chloride is reacted with an aqueous solution of from about 30% to about 50% by weight of potassium hydroxide at a pH in the range of from about 5.5 to about 8.0 and at a temperature in the range of from about 0° C. to about 65° C. until crystalline potassium dichlorocyanurate is formed.

In still another preferred embodiment of the processes of this invention sodium dichlorocyanurate may be prepared by substituting an aqueous solution of sodium hydroxide for the above referred to aqueous solution of potassium hydroxide and reacting the sodium hydroxide solution with dichlorocyanuric acid under the above described conditions.

As previously noted, the dichlorocyanuric acid product containing less than 0.1% by weight NaCl and the aqueous solution of potassium hydroxide are brought together, preferably in an aqueous medium at a rate and with sufficient agitation so as to maintain a pH in the range of from about 5.5 to about 8.0 but preferably from about 6.0 to about 7.5. Any means of agitation which provides an intimate and uniform contacting of the respective reagents may be employed. It is preferred that the reaction zone to which the respective reagents are added be initially charged with an aqueous heel which may be water per se or an aqueous solution of potassium dichlorocyanurate. A particularly useful heel is the mother liquor (e.g. the centrifuge effluent) of a previously conducted reaction in which dichlorocyanuric acid and potassium hydroxide were reacted in accordance with the processes of the present invention.

In another embodiment of this invention it has been found possible to prepare, under batch or continuous conditions sodium dichlorocyanurate characterized in having large crystals and improved stability to loss of available chlorine which comprises the steps of preparing the dichlorocyanurate product (as hereinbefore described) which contains between 0.01% to below about 0.1% by weight of sodium chloride and reacting this product with an aqueous solution containing from about 30% to about 50% by weight of sodium hydroxide at a pH in the range of from about 6.0 to about 7.5 and at a temperature in the range of between 0° C. and 65° C. By so proceeding a crystalline hydrate of sodium dichlorocyanurate composed of large crystals is obtained. These crystals have a size such that a major proportion of such crystals, usually more than 65%, are retained on a No. 60 mesh U.S. standard screen.

In accordance with the aforedescribed processes of this invention crystalline sodium dichlorocyanurate and/or crystalline potassium dichlorocyanurate and hydrates of these dichlorocyanurates are obtained in high yields. Such products are composed in each instance of large crystals whose crystals contain from about 0.01 to about 0.1% by weight of sodium chloride and the products are substantially free of other alkali metal chlorides.

The following specific examples are intended to illustrate the invention but not to limit the scope thereof, parts and percentages being by weight unless otherwise specified.

*Example I*

One kilogram of dichlorocyanuric acid containing 2.5% by weight of sodium chloride was washed three times with 5 liter portions of distilled water by forming an aqueous slurry of the dichlorocyanuric acid and agitating such slurry in each of the three instances with a mechanical stirrer for periods of from 3 to 5 minutes. The dichlorocyanuric acid was separated from the slurry by filtration through a Büchner funnel in each instance. The dichlorocyanuric acid product was dried and analyzed for sodium chloride and found to contain 0.07% by weight of sodium chloride. Two hundred grams of this product were employed to prepare potassium dichlorocyanurate in accordance with the following specific procedure.

To a suitable reaction vessel equipped with a thermometer, agitator, an off-gas tube, and an ice-bath for controlling the reaction temperature is charged an aqueous solution of potassium dichloroisocyanurate containing approximately 20 parts by weight of potassium dichloroisocyanurate and 200 parts by weight of water which solution has a pH of 5.7. Thereto is added with constant agitation 56 parts by weight of potassium hydroxide in the form of a 45% by weight aqueous solution thereof and 198 parts by weight of dichloroisocyanuric acid in the form of a 77% by weight water wet solid (i.e., wet solid containing 23% by weight water) respectively at such a rate so as to maintain the pH in the range of 5.6 to 5.8. The dichlorocyanuric acid contained 0.07% by weight, based on the weight of the dichlorocyanuric acid, of NaCl. Throughout the addition of the respective reagents the temperature of the reaction mixture is maintained in the range of 28° C. to 32° C. A substantially constant volume is maintained in the reaction zone by removing a portion of the solid reaction product together with the aqueous phase of the slurry periodically by means of a suction pump into a suitable receiver wherein the slurry is cooled to 25° C. and centrifuged. The centrifuge cake which contained 2% moisture and potassium dichloroisocyanurate in the form of a monohydrate (i.e., this monohydrate contains 7% by weight water of hydration) is then dried at 100° C. to remove all of the water (both combined and uncombined) yielding crystalline potassium dichloroisocyanurate composed of large crystals, 76% of which were retained on a No. 60 mesh U.S. standard screen. The crystals had an internal monoclinic symmetry and an external triclinic symmetry. The mother liquor (which has a pH in the range of 5.6 to 5.8) was then concentrated under vacuum at 40° C. so as to remove substantially 50% of the water and the concentrated solution returned to the reaction zone so as to maintain the water balance for a 40% solids content in the reaction zone. The average sojourn time in the reactor and cooling receptacle was one hour. The dried white crystalline product had the above-described crystalline symmetry and contained 0.01% NaCl (i.e., contains more than 98% $KC_3N_3O_3Cl_2$) and had an available chlorine content of 59.8% or 99.4% of theory and based on the potassium hydroxide charged the yield was 100%. The size and shape of this anhydrous product is the same as that of its precursor, i.e., potassium dichloroisocyanurate monohydrate.

*Example II*

To a suitable reaction vessel equipped with a thermometer, agitator, an off-gas tube and a water bath for controlling the reaction temperature there was charged 250 parts by weight of water. Thereto was added with constant agitation 56 parts by weight of potassium hydroxide in the form of a 45% by weight aqueous solution thereof and 198 parts by weight of dichloroisocyanuric acid prepared in Example I in the form of a 77% by weight water wet solid (i.e., a wet solid containing 23% by weight water) and 0.07% by weight, based on the weight of the dichlorocyanuric acid, of NaCl respectively at such a rate so as to maintain the pH in the range of 5.6 to 5.8. Throughout the addition of the respective reagents the temperature of the reaction mixture was maintained in the range of 60° C. to 64° C. while bubbling air through the reaction mass to assist in the rapid removal of any possible gaseous decomposition products. A substantially constant volume was maintained in the reaction zone by removing a portion of the solid reaction product together with the aqueous phase of the slurry periodically by means of a suction pump into a suitable receiver wherein the slurry was maintained at 58–60° C. and centrifuged. The centrifuge cake which contained about 10% moisture and anhydrous potassium dichloroisocyanurate is then dried at 100° C. to remove all of the water yielding potassium dichloroisocyanurate as large flat plate crystals which had monoclinic external and internal symmetries. Sixty-one percent of the crystals were retained on a 60 mesh U.S. standard screen. The mother liquor (which had a pH in the range of 5.6 to 5.8) was then concentrated under vacuum at 60° C. so as to remove substantially 45% of the water and the concentrated solution returned to the reaction zone so as to maintain the water balance for a 35% solids content in the reaction zone. The average sojourn time in the reaction zone and cooling receptacle was one hour. The dried flat plate product was substantially potassium dichloroisocyanurate containing 0.01% NaCl and had a substantially theoretical available chlorine content and based on the potassium hydroxide charged the yield was substantially 100%.

*Example III*

To a suitable reaction vessel equipped with a thermometer, agitator, an off-gas tube, and a water bath for controlling the reaction temperature was charged 250 parts by weight of water. Thereto was added with constant agitation 56 parts by weight of potassium hydroxide in the form of a 45% by weight aqueous solution thereof and 198 parts by weight of dichloroisocyanuric acid in the form of a 50% by weight water wet solid (i.e. a wet solid containing 50% by weight water) and 0.04% by weight, based on the weight of the dichlorocyanuric acid, of NaCl respectively, at such a rate so as to maintain the pH in the range of 5.7 to 6.1. Throughout the addition of the respective reagents the temperature of the reaction mixture was maintained in the range of 60° C. to 64° C. while bubbling air through the reaction mass to assist in the rapid removal of any possible gaseous decomposition products. A substantially constant volume was maintained in the reaction zone by removing a portion of the solid reaction product together with the aqueous phase of the slurry periodically by means of a suction pump into a suitable receiver wherein the slurry was cooled to 15° C. and centrifuged. The centrifuge cake which contained about 10% water and crystalline potassium dichloroisocyanurate (i.e., a mixture of crystalline anhydrous potassium dichlorocyanurate having internal and external monoclinic symmetries and a smaller amount of potassium dichloroisocyanurate monohydrate) was then dried at 100° C. to remove all of the water yielding large crystals of potassium dichloroisocyanurate having the above described symmetries in admixture with a small amount of crystals having an internal monoclinic symmetry and an external triclinic symmetry. The mother liquor (which had a pH of approximately 6.0) was then concentrated under vacuum at 40° C. so as to remove substantially 45% of the water and the concentrated solution returned to the reaction zone so as to maintain the water valence for a 35% solids content in the reaction zone. The average sojourn time in the reaction zone and cooling receptacle is one hour. The dried crystalline product was potassium dichloroisocyanurate as a mixture of the two anhydrous crystalline forms and which contained 0.02% by weight of NaCl and had a substantially theoretical available chlorine content and based on the potassium hydroxide charged the yield is substantially 100%. The crystals were large plates and had a size such that 67% of the crystals were retained on a No. 60 mesh U.S. standard screen.

*Example IV*

The procedure of Example III was repeated except that 60 parts of an aqueous solution of sodium hydroxide containing 50% by weight of NaOH was used in place of the potassium hydroxide aqueous solution employed in that example. The product prior to drying consisted of large crystals of the monohydrate of sodium dichlorocyanurate. This product was dried in a vacuum at 20° C. to obtain a dried crystalline monohydrate of sodium dichlorocyanurate. Sixty-three percent of the crystals were of a size such that they were retained on a No. 60 mesh U.S. standard screen. The crystals contained 0.02% of NaCl. A portion of the crystals was further dried at 40° C. and became somewhat smaller and after this drying procedure 54% of the crystals were retained on a No. 60 mesh U.S. standard screen.

Surprisingly, when the procedure of Example III was employed using a dichlorocyanuric acid product containing 0.6% by weight of KCl substantially all of the crystalline products obtained passed through a No. 100 mesh U.S. standard screen.

Also when the procedure of Example III was repeated using a dichlorocyanuric acid product which contained 0.4% by weight of sodium chloride all of the crystals obtained passed through a No. 60 mesh U.S. standard screen and 90% of the crystals passed through a No. 100 mesh U.S. standard screen.

*Example V*

To illustrate the stability of the sodium and potassium dichlorocyanurate products obtained in accordance with this invention the following compositions were prepared containing the ingredients in the amounts (parts by weight) listed below.

| Ingredient | Composition No. | | |
|---|---|---|---|
| | 1 | 2 | 3 |
| Sodium tripolyphosphate | 40 | 40 | 40 |
| Sodium dodecyl benzene sulfonate | 2.5 | 2.5 | 2.5 |
| Sodium carbonate | 5.0 | 5.0 | 5.0 |
| Sodium sulfate | 32.5 | 32.5 | 32.5 |
| Potassium dichlorocyanurate [1] | 20.0 | | |
| Potassium dichlorocyanurate [2] | | 20.0 | |
| Sodium dichlorocyanurate [3] | | | 20.0 |

[1] Product prepared in Example I.
[2] Product prepared in Example II.
[3] Product prepared in Example IV.

The above three compositions were placed in a humidity cabinet maintained at a temperature of 75° C. and a relative humidity of 75%. Available chlorine determinations were run every seven days for a period of two weeks and the results are given in the following table.

| Composition No. | Available Chlorine (percent) | | |
|---|---|---|---|
| | Initial | 7 days | 14 days |
| 1 | 11.86 | 11.80 | 11.40 |
| 2 | 11.85 | 11.40 | 10.9 |
| 4 | 12.5 | 11.80 | 10.7 |

When sodium and potassium dichlorocyanurate composed of small crystals and prepared from dichlorocyanuric acid products which contain large amounts, e.g. 0.3%, by weight of sodium and potassium chloride were incorporated in the above compositions in place of the dichlorocyanurate products incorporated therein compositions containing these products lost between 20% and 30% more available chlorine (e.g. they contained less than 9% available chlorine after initially having the same available chlorine content) after 14 days than compositions containing the above products. All such crystals had a size such that 90% passed through a No. 100 mesh U.S. standard screen.

What is claimed is:

1. A process for preparing a crystalline alkali metal dichlorocyanurate characterized in being composed of large crystals and in having improved stability to loss of available chlorine which comprises reacting a dichlorocyanuric acid product containing sodium chloride but not more than 0.1% by weight of sodium chloride and an alkali metal hydroxide in an aqueous medium at a pH in the range of from about 5.5 to about 8.0 and at a temperature in the range of between about 0° C. and 65° C. until a crystalline alkali metal dichlorocyanurate is formed.

2. A process as in claim 1 wherein the alkali metal hydroxide is sodium hydroxide and the alkali metal dichlorocyanurate is sodium dichlorocyanurate.

3. A process as in claim 1 wherein the alkali metal hydroxide is potassium hydroxide and the crystalline alkali metal dichlorocyanurate is potassium dichlorocyanurate.

4. A process for making a crystalline alkali metal dichlorocyanurate characterized in being composed of large crystals and in having improved stability to loss of available chlorine which comprises the steps of (1) preparing dichlorocyanuric acid by reacting disodium cyanurate and chlorine in an aqueous medium to form a reaction mixture comprising an aqueous slurry consisting substantially of solid dichlorocyanuric acid suspended in an aqueous solution of sodium chloride, (2) recovering the solid dichlorocyanuric acid product consisting of a mixture comprising dichlorocyanuric acid and a minor amount of sodium chloride from the bulk of the aqueous phase of said slurry, (3) separating the sodium chloride from said product until a dichlorocyanuric acid product containing sodium chloride but not more than 0.1% by weight of sodium chloride is obtained, and (4) reacting the last mentioned dichlorocyanuric acid product with an alkali metal hydroxide in an aqueous medium at a pH in the range of from about 5.5 to about 8.0 and at a temperature in the range of between about 0° C. to 65° C. until a crystalline alkali metal dichlorocyanuric acid is formed.

5. A process as in claim 4, wherein the dichlorocyanuric acid product obtained from the bulk of the aqueous phase of the slurry consists of a mixture comprising dichlorocyanuric acid, from about 0.3 to about 3.0% by weight based on the weight of the product of sodium chloride and from about 5% to about 25% by weight of water and the sodium chloride is separated from the dichlorocyanuric acid product by washing said product with water until it contains 0.1% or less by weight based on the weight of the dichlorocyanuric acid of sodium chloride.

6. A process as in claim 4, wherein the cyanuric acid product contains from about 0.01% to about 0.1% by weight of sodium chloride and is reacted with an aqueous solution of an alkali metal hydroxide containing from about 30% to about 50% by weight of said alkali metal hydroxide and the reaction was conducted at a pH in the range of between about 6.0 to about 7.5 and at a temperature in the range of between about 20° C. and about 40° C.

7. A process for making crystalline potassium dichlorocyanurate characterized in being composed of large crystals and having improved stability to loss of available chlorine which comprises the steps of (1) preparing dichlorocyanuric acid by reacting disodium cyanurate and chlorine in an aqueous medium to form a reaction mixture comprising an aqueous slurry consisting substantially of solid dichlorocyanuric acid suspended in an aqueous solution of sodium chloride, (2) recovering a solid dichlorocyanuric acid product consisting of a mixture comprising dichlorocyanuric acid and from about 0.3% to about 3.0% by weight of sodium chloride, (3) washing said product with water until a dichlorocyanuric acid product containing from about 0.01% to about 0.1% by weight of sodium chloride is obtained, and (4) reacting the last mentioned dichlorocyanuric acid product with potassium hydroxide in an aqueous medium at a pH in the range of from between about 5.5 to about 8.0 and at a temperature in the range of from about 20° C. to about 40° C. until a crystalline potassium dichlorocyanurate is formed.

8. A process for making crystalline sodium dichlorocyanurate characterized in being composed of large crystals and in having improved stability to loss of available chlorine which comprises the steps of (1) preparing dichlorocyanuric acid by reacting disodium cyanurate and chlorine in an aqueous medium to form a reaction mixture comprising an aqueous slurry consisting substantially of solid dichlorocyanuric acid suspended in an aqueous solution of sodium chloride, (2) recovering a solid dichlorocyanuric acid product consisting of a mixture comprising dichlorocyanuric acid and from about 0.3% to about 3.0% by weight of sodium chloride, (3) washing said product with water until a dichlorocyanuric acid product containing from about 0.01% to about 0.1% by weight of sodium chloride is obtained, and (4) reacting the last mentioned dichlorocyanuric acid product with sodium hydroxide in an aqueous medium at a pH in the range of from between about 6.0 to about 7.5 and at a temperature in the range of from about 0° C. to about 65° C. until crystalline sodium dichlorocyanurate is formed.

9. A process for making crystalline potassium dichlorocyanurate having large crystals which are characterized in having a triclinic internal and external symmetry and are further characterized in having improved stability to loss of available chlorine which comprises the steps of (1) preparing dichlorocyanuric acid by reacting disodium cyanurate and chlorine in an aqueous medium at a pH in the range of from about 2.0 to 4.5 and at a temperature in the range of from about 10° C. to about 35° C. to form a reaction mixture comprising an aqueous slurry consisting substantially of solid dichlorocyanuric acid suspended in an aqueous solution of sodium chloride, (2) recovering a solid dichlorocyanuric acid product consisting of a mixture comprising dichlorocyanuric acid and from about 0.3 to about 3% by weight of sodium chloride and from about 5% to about 15% by weight of water, (3) washing said product with water until a dichlorocyanuric acid product containing from about 0.01 to less than about 0.1% by weight of sodium chloride is formed, and (4) reacting the last mentioned dichlorocyanuric acid product with an aqueous solution containing from about 40% to about 50% by weight of potassium hydroxide at a pH in the range of from about 6.0 to about 7.5 and at a temperature in the range of from about 20° C. to about 40° C.

10. A process for making crystalline potassium dichlorocyanurate characterized in having large crystals whose internal and external symmetry is nonoclinic and being further characterized in having improved stability to loss of available chlorine which comprises the steps of (1) preparing dichlorocyanuric acid by reacting disodium cyanurate and chlorine in an aqueous medium at a pH in the range of from about 2.0 to 4.5 and at a temperature in the range of from about 10° C. to about 35° C. to form a reaction mixture comprising an aqueous slurry consisting substantially of solid dichlorocyanuric acid suspended in an aqueous solution of sodium chloride, (2) recovering a solid dichlorocyanuric acid product consisting of a mixture comprising dichlorocyanuric acid and from about 0.3 to about 3% by weight of sodium chloride and from about 5% to about 15% by weight of water, (3) washing said product with water until a dichlorocyanuric acid product containing from about 0.01 to less than about 0.1% by weight of sodium chloride is formed, and (4) reacting the last mentioned dichlorocyanuric acid product with an aqueous solution containing from about 40% to about 50% by weight of potassium hydroxide at a pH in the range of from about 6.0 to about 7.5 and at a temperature in the range of from about 52° C. to about 65° C.

11. A continuous process for making crystalline sodium dichlorocyanurate characterized in having large crystals and improved stability toward loss of available chlorine which comprises the steps of (1) continuously preparing dichlorocyanuric acid by reacting disodium cyanurate and gaseous chlorine in an aqueous medium at a pH in the range of from about 2.0 to about 4.5 to continuously form a reaction mixture comprising an aqueous slurry consisting substantially of solid dichlorocyanuric acid in an aqueous solution of sodium chloride, (2) continuously recovering a solid dichlorocyanuric acid product consisting of a mixture comprising dichlorocyanuric acid and from about 0.3% to about 3% by weight of sodium chloride, (3) continuously washing said product with water until a dichlorocyanuric acid product containing from about 0.01% to below about 0.1% by weight of sodium chloride is continuously formed, and (4) continuously reacting the last mentioned dichlorocyanuric acid product with an aqueous solution containing from about 40 to about 50% by weight of sodium hydroxide at a pH in the range of from about 6.0 to 7.5 and at a temperature in the range of from about 20° C. to about 40° C. thereby continuously forming an aqueous slurry comprising large crystals of sodium dichlorocyanurate suspended in water and thereafter recovering said large crystals from the bulk of the aqueous phase of said slurry.

12. A continuous process for preparing crystalline potassium dichlorocyanurate characterized in having large crystals and improved stability toward loss of available chlorine which comprises the steps of (1) continuously preparing dichlorocyanuric acid by continuously reacting disodium cyanurate and chlorine in an aqueous medium to continuously form a reaction mixture comprising an aqueous slurry consisting substantially of solid dichlorocyanuric acid and an aqueous solution of sodium chloride, (2) continuously recovering a solid dichlorocyanuric acid product consisting of a mixture comprising dichlorocyanuric acid and from about 0.3% to about 3.0% by weight of sodium chloride, (3) continuously washing said product with water thereby forming a dichlorocyanuric acid product containing from about 0.01% to below about 0.1% by weight of sodium chloride, and (4) continuously reacting the last mentioned dichlorocyanuric acid product with an aqueous solution containing from about 40% to about 50% by weight of potassium hydroxide at a pH in the range of from about 6.0 to about 7.5 and at a temperature in the range of from about 20° C. to about 40° C. thereby continuously forming an aqueous slurry consisting substantially of large crystals of potassium dichlorocyanurate suspended in water and thereafter continuously recovering said large crystals from the bulk of the aqueous phase of said slurry.

13. A crystalline alkali metal dichlorocyanurate product selected from the group consisting of crystalline sodium dichlorocyanurate and crystalline potassium dichlorocyanurate and hydrates thereof whose crystals are characterized in containing from 0.01 to about 0.1% by weight of sodium chloride and are otherwise substantially free of other metal chlorides, said dichlorocyanurate product being produced by the process set forth in claim 4.

14. A crystalline sodium dichlorocyanurate whose crystals are characterized in containing from about 0.01 to about 0.1% by weight of sodium chloride and which are substantially free of other metal chlorides, said dichlorocyanurate being produced by the process set forth in claim 8.

15. A crystalline potassium dichlorocyanurate whose crystals are characterized in containing from about 0.01 to about 0.1% by weight of sodium chloride and which are substantially free of other metal chlorides, said dichlorocyanurate being produced by the process set forth in claim 12.

References Cited by the Examiner

UNITED STATES PATENTS 3,035,054  5/1962  Symes et al. _____ 260—248
3,035,057  5/1962  Symes et al. _____ 260—248
3,145,206  8/1964  Fuchs et al. _____ 260—248

OTHER REFERENCES

Ludwig: Chemical Engineering (January 1954), pp. 156–159.

WALTER A. MODANCE, *Primary Examiner.*

J. M. FORD, *Assistant Examiner.*